April 13, 1965 R. S. CRAWFORD ETAL 3,178,539
THERMOSTAT WITH CAM-ACTUATED AUXILIARY SWITCH
Filed Feb. 11, 1963 2 Sheets-Sheet 1
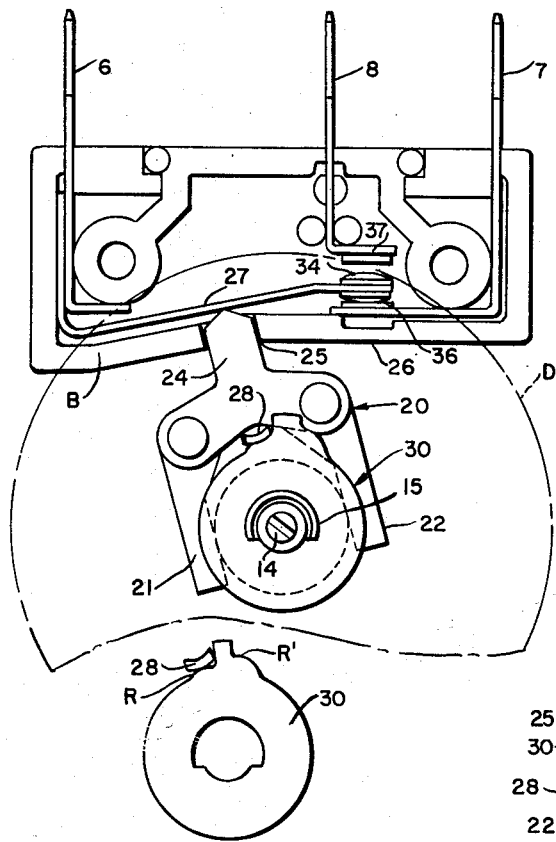
FIG. 2.
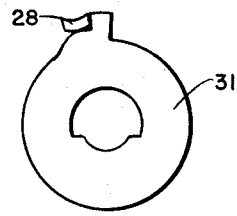
FIG. 3.
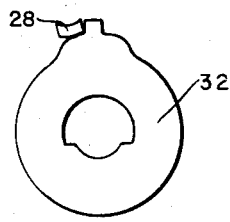
FIG. 4.
FIG. 5.
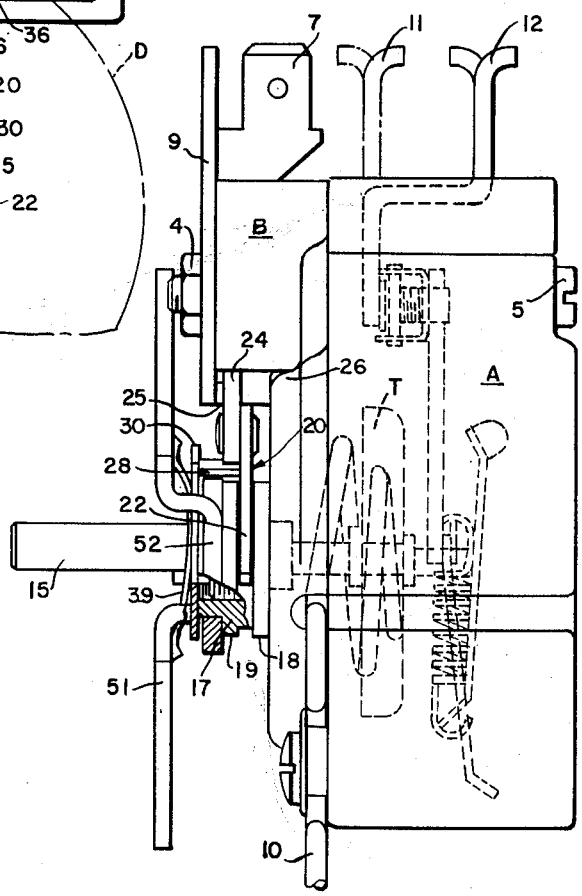
FIG. 1.
INVENTORS
Robert S. Crawford &
BY Siegfried E. Manecke
Birch and O'Brien
ATTORNEYS

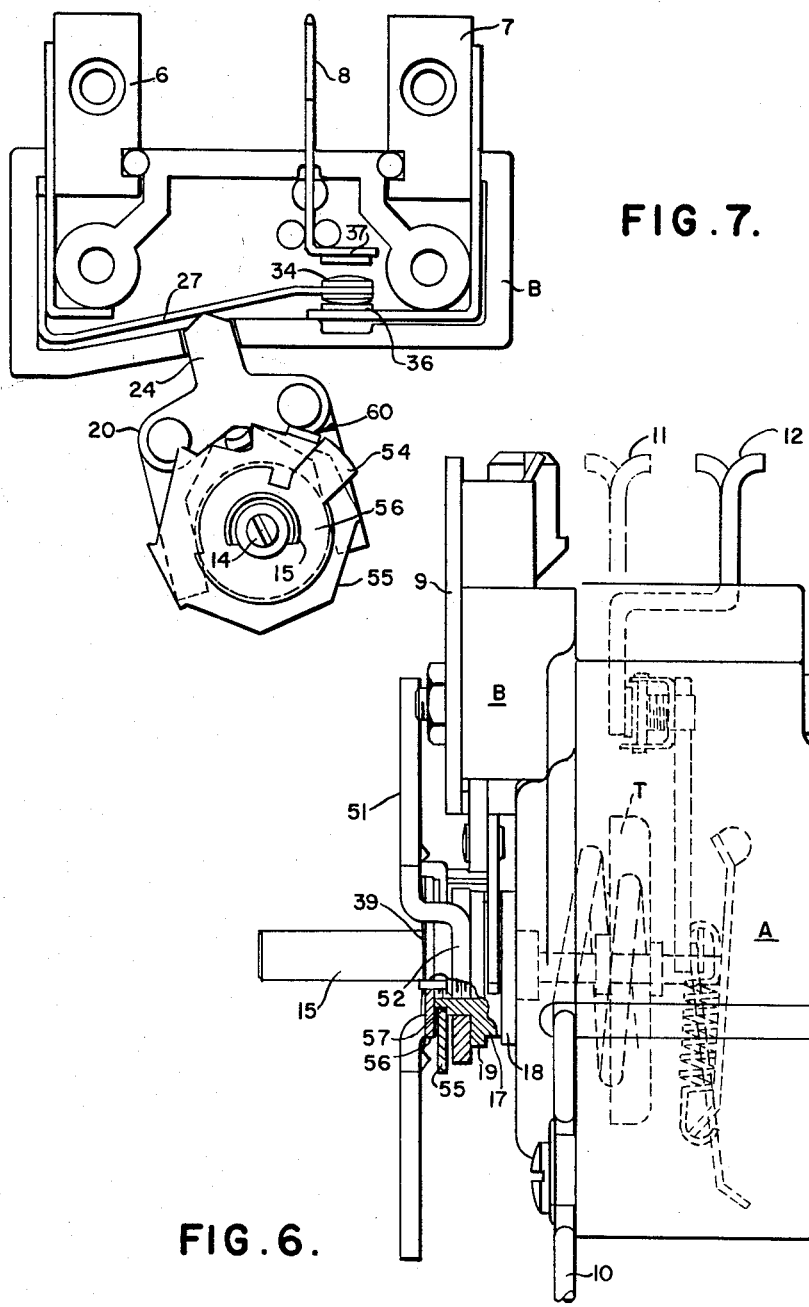

United States Patent Office 3,178,539
Patented Apr. 13, 1965

3,178,539
THERMOSTAT WITH CAM-ACTUATED
AUXILIARY SWITCH
Robert S. Crawford and Siegfried E. Manecke, Indiana, Pa., assignors to Robertshaw Controls Company, a corporation of Delaware
Filed Feb. 11, 1963, Ser. No. 257,668
11 Claims. (Cl. 200—140)

The present invention relates to electric oven controls and more particularly to the novel combination of separately housed auxiliary switch means for use in conjunction with a separately housed simple single pole switch thermostat.

In oven control thermostats the heater elements in the oven are controlled by thermostatic means, which usually operatively connect through dial indexed cam means to a plurality of switches to provide for on-off, broil, preheat and bake temperatures, such arrangements being assembled at the factory in one unitary housing. Such units with the switches and switch thermostat means all built into one housing are rather complex because of the many switch elements and connections and are not versatile units when all in one housing since they are made only to accommodate the specific control operations for which they are assembled.

It is an object of this invention to provide for greater economy plus versatility in electric thermostat controls by use of a simple and inexpensive single pole electric thermostat control combined with various interchangeable auxiliary switch mechanisms, not built in as an original part of the main thermostatic switch housing, but mounted in a separable housing attachable to the thermostat housing controlled by cam means mounted on a dial shaft rotatably mounted in a wall of the thermostat housing for control of oven heaters or the like.

Another object is to provide versatility in electric thermostatic oven controls using a simple single pole switch by combining with it an auxiliary switch means and operatively associated interchangeable cam means for operating the auxiliary switch means, whereby it is possible to provide such thermostats with functions such as double line break in "OFF," single or double line break in "OFF" combined with switching at "High Stop" between the normally closed and open contacts of the auxiliary switching means.

Yet another object is to provide an improved control incorporating lost motion, that is, converting the lost motion of prior art electric thermostatic controls into continuous control operation in either a clockwise or a counterclockwise direction.

With these and other objects in view which will become apparent as the invention is fully understood, the same resides in the novelty of construction, combination and arrangement of elements hereinafter described in detail and distinctly claimed in the appended claims.

The description should be read in conjunction with the accompanying drawings wherein:

FIGURE 1 illustrates an embodiment of the present invention and is a side elevation view of a thermostat housing with a control shaft and cam arrangement mounted thereon partly in cross section and a cooperating auxiliary switch housing secured to the thermostat housing in coactive relation with respect to the control shaft and cam arrangement;

FIGURE 2 is a front elevation view of the auxiliary switch housing with the front cover thereof removed to expose the switch mechanism and a front view of the control shaft, cam and auxiliary switch actuator means of FIGURE 1;

FIGURE 3 is a face view of one form of cam used to impart activation to the auxiliary switch actuator;

FIGURES 4 and 5 are different forms of cams which may be interchanged with the cam of FIGURE 3 to obtain different switching operations, if desired, for a particular type of domestic appliance;

FIGURE 6 is another embodiment of the invention using a different cam whereby a slight alteration of the control shaft assemblage permits complete clockwise or counterclockwise turning of the cam shaft to desired settings, thereby converting lost motion into control operation; and FIGURE 7 is a front elevation view of the auxiliary switch housing with the cover removed to expose the switch means and also a front view of the control shaft cam and stop arrangement for incorporating lost motion by providing control settings when rotation of the control shaft is in either a clockwise or a counterclockwise direction.

Referring in detail to the drawings and first with particular reference to the embodiment illustrated in FIGURES 1, 2 and 3, there is provided a well-known simple single pole snap acting thermostat T suitably mounted in a housing A adjacent a wall thereof, which thermostatic diaphragm portion is connected with a capillary tube 10 from a bulb suitably positioned in a domestic appliance, such for example as an electrically heated oven chamber, not shown.

The housing A houses a single pole on-off snap acting thermostat arranged to either open or close its contacts when the bulb temperature rises to a start setting to open or close an electric circuit supplied at connections 11 and 12 at the top of the housing to the contacts of a snap acting single pole switch in the housing. This switch and thermostatic device per se are generally known and accordingly are not described in detail it sufficing to state that the thermostat in housing A opens and closes the switch single pole contacts in housing A when the bulb temperature rises to a set position according to the angular adjustment of a control shaft 15 threadedly engaged with a hub 17 secured to the front wall of housing A and according to the adjustment of a calibration screw 14 extending from within the bore of the control shaft 15 into housing A adjacent the thermostat T therein. A dial D with a key socket is frictionally mounted on the end of the tubular control shaft 15.

At the top of housing A and conformably secured to the same is a second relatively smaller housing B. Projecting from the top wall of housing B are terminals 6, 7 and 8 of the auxiliary switch means therein. These terminals extend from within the housing B and are held in place by an insulated cover 9 secured by suitable means, such as nuts 4 threaded over the ends of bolts 5, see FIGURE 1, which serve to fasten the housing B to the upper portion of the front wall of thermostat housing A. The terminals 6 and 7 each nest in spaced slots in the housing B and the terminal 8 is predeterminedly positioned between the terminals 6 and 7 by a notch with a slot in the casing, which permits the terminal 8 to extend therefrom.

The dial control shaft 15 is rotatably mounted in an internally threaded hub 17 secured to the front wall of housing A below the housing B. The control shaft includes means assembled thereon for the actuation of the auxiliary switching means in the housing B mounted across the top of housing A above the control shaft assemblage.

The hub 17 is provided with an annular groove between the thrust flange 18 and complementary spaced flange 19. Loosely mounted on the hub in the groove between the flanges is the U-shaped base of an auxiliary switch actuator 20. The U-shaped base of the actuator 20 is in effect a yoke with a bridge portion and spaced yoke arms 21 and 22.

The yoke arms 21 and 22 are curved to be shaft conforming and loosely straddle or embrace the hub 17 at the annular portion between the flanges 18 and 19, so as to be free to rock angularly on the hub axis. The top of the bridge portion of the actuator yoke 20 is formed with a centrally extending switch thrust head 24, which is positioned to extend angularly upward from the hub 17 through an opening 25 in the bottom wall 26 of the auxiliary housing B and into constant contact with a movable flexible switch arm 27 of the auxiliary switching means therein.

The auxiliary switch actuator yoke 20 is formed with a lateral projection or cam follower 28, which extends from a medial point on the lower edge of underside of the bridge portion between yoke arms 21 and 22. This cam follower 28 is rounded in transverse section and so shaped and so proportioned as to smoothly follow the peripheral edge or rise portion R or R' of the cam member 30, aligned with respect to hub 17 on the control shaft 15.

The rise portions of cam 30 cause follower 28 to move as a function thereof, whereby the cam precisely controls the movement of the actuator 20 to move the flexible auxiliary switch arm 27. This switch arm carries contact 34, which moves between fixed contacts 36 and 37 of terminals 7 and 8, see FIGURES 1 and 2.

Cam 30 is formed with a key socket to frictionally fit on dial control shaft 15 to thereby turn with the shaft and the temperature adjustment screw 14 of the shaft bore may be adjusted for providing the minimum of lost motion from the thermostat in housing A. As the cam 30 is rotated the actuator 20 is moved transversely in accordance with the rise portions of cam 30. Thus, the rise R' of the cam 30 when engaged by cam follower 28 causes sufficient transverse motion to be imparted to contact 34 by actuator head 24 to move it from contact 36 into engagement with contact 37. Rise R, however, is less than the cam rise R' of cam 30 so that actuator 20 is moved with a lesser throw at the end of counterclockwise rotation of the dial shaft 15, whereby the switch blade 27 is moved to a lesser degree, so that the contact 34 moves only to an intermediate "OFF" position between contact 36 and contact 37. Cam 31, shown in FIGURE 4, has only one cam rise. If it is used, actuator head 24 will be moved only when cam 31 is moved as far counterclockwise as possible. In this case, the rise in cam 31 will impart sufficient transverse motion to be imparted to contact 34 by actuator head 24 to move it from contact 36 into engagement with contact 37.

Then still another possible arrangement of cam operation is accomplished with the rise of cam 32, shown in FIGURE 5, which cam is provided with full rises at each end of the dial shaft rotation thus closing the auxiliary switch contacts at each end of a clockwise or counterclockwise rotation of the setting dial, thereby converting each rotation of the dial shaft in either direction into a control operation.

With reference to the versatile character of the present novel invention and the interchange possible by replacing the cam 30 of FIGURE 3 with either of the cams 31 or 32 of FIGURES 4 and 5, such interchange may be made quickly and simply and when using these alternate cams, the terminal 8 may be omitted and the control action may be through the contacts 34 and 36 of the auxiliary switch means. Then also other cam arrangements are possible and may be provided as customer needs develop. In each instance of cam interchange, the same are secured to the shaft 15 by suitable means, such as a securing key yoke 39. Also, an escutcheon plate 51 formed with a countersunk spider mounting ring 52 is secured to the outer face of the flange 19. This may be accomplished by spot welding ring 52 to flange 19. This plate 51 is formed with fastener openings in the field of the plate to permit attachment of the unit in operating position for controlling an electric appliance, see FIGURE 1.

As a further example, another arrangement of cam for auxiliary switch operation is disclosed in FIGURES 6 and 7, wherein there is provided an arrangement to permit a full range of control settings of either of two appliance circuits selected through an incorporated lost motion control means. Normally, such optional control of two appliance circuits requires a selector switch operated separately from dial control shaft. This arrangement for incorporating control lost motion is accomplished by modifying the structure of the controlling cam 55, the addition of a cam coacting limit stop disk 56 with a radial projection 54 to control the terminus of a complete cycle of rotation at the end of either a clockwise or counterclockwise turning of the control shaft 15 and by providing a bearing surface 57 for the cam 55. Otherwise the respective housings A and B and their enclosed elements are of the same standard construction and the dial control shaft 15, and actuator 20 are identical and such identical parts are given the identifying numerals. Also, the same key yoke 39 may be used to secure the stop disk 56 on shaft 15 and maintain operating cam 55, which is carried on the circumferential bearing surface 57 provided by hub 17 in position between disk 56 and flange 19 of hub 17 so cam 55 can be moved about the axis of control shaft 15. The tubular shaft 15 with the adjusting screw 14 therein for the thermostat in casing A are identical with the first embodiment of FIGURES 1 and 2.

As in the first embodiment where operating cam 30 is positioned co-axially with control shaft 15, the centrally apertured operating cam 55 is also positioned co-axially with the control shaft 15, so that the cam follower 28 of the auxiliary switch actuator 20 on the hub is properly positioned on hub 17 and follows the periphery of cam 55 as it is moved angularly in either a clockwise or a counterclockwise direction by the rotatable stop member 56. This stop member is rotatable with the control shaft 15 to final engagement with either the left or right side of the forward projection or lug 60 carried by the cam 55 and thus control setting of dial D may be made in either direction of shaft rotation.

For example, in turning clockwise from the position shown in FIGURE 7, temperature selections can be made for controlling a circuit including contacts 34 and 36, until rotation brings the radial projection 54 of stop disk into contact with one side of the laterally extending thrust lug 60 of cam 55. Further dial rotation now causes cam 55 to move and thereby impart movement to actuator 20, so that auxiliary switch contact 34 moves from contact 36 to contact 37. Then returning dial shaft in a counterclockwise rotation does not disturb the contact established between contacts 34 and 37 until, again, the radial projection 54 of disk 56 comes into contact with the other side of the thrust lug 60 of cam 55. Further rotation then permits the movable contact 34 to return to its original position. Thus, there is provided by this embodiment a novel arrangement, whereby temperature selections can be made when contacts 34 and 36 are engaged and also when contacts 34 and 37 are in contact with one another.

Without further description, it is believed apparent that this invention provides a novel arrangement of separate inexpensive interchangeable elements which may be assembled economically, thereby simplifying and materially reducing the cost of heretofore relatively non-versatile, complex and expensive electric thermostatic controls and whereby a versatile control is provided and may be assembled when desired to incorporate lost motion to provide selective control operation of two electric circuits. Thus, for example, the latter arrangement can be used to provide thermostatic control of an oven by selectively connecting the heating element used for broiling in circuit or connecting the heating element used for baking in circuit. Such selective connection and selection of the desired operating temperature is accomplished by the operation of a single control dial.

While the foregoing specification describes and the drawings illustrate the specific details of the various embodiments of the invention, it is to be expressly understood that the same is not limited by these details and is therefore susceptible to changes and further modifications without departing from the concept of the invention. To determine the scope of this invention reference should be had to the appended claims.

What is claimed is:

1. An electric thermostat control comprising in combination: a first housing with circuit terminals and a thermostatically controlled switch actuatable according to a control setting; a control assembly including a rotatable control shaft extending into said housing connected to said switch for setting said switch; a second housing with circuit terminals extending through a wall thereof for connection in an electric circuit, said second housing enclosing auxiliary switch means connected with said terminals of the second housing, said auxiliary switch means having movable contact means and fixed contact means; switch actuator means having a cam follower, said actuator means being loosely mounted about said control shaft and engaged with said movable contact means; and cam means being positioned co-axially in connection with said shaft, said cam means having a cam surface engaged with said cam follower, whereby the angular adjustment of said shaft causes angular motion of said cam means and movement of said actuator means to move said movable contact means to and from said fixed contact means in the second housing.

2. An electric thermostat control comprising in combination: a first housing with circuit terminals and a thermostatically controlled switch actuatable according to a control setting; a control assembly including a rotatable control shaft extending into said housing connected to said switch for setting the switch; a second housing with circuit terminals extending through a wall thereof for connection to an electric circuit, said second housing enclosing auxiliary switch means connected with said terminals of the second housing, said auxiliary switch means having movable contact means and fixed contact means; a switch actuator comprising a yoke, said yoke having spaced depending arms straddling said control shaft; a cam follower on said yoke, said yoke including an upwardly extending head, said head extending into the said second housing for engagement with the movable contact of said auxiliary switch means; and cam means having a cam surface, said cam means being positioned co-axially in connection with said control shaft, angular adjustment of said shaft moving said cam surface with respect to said cam follower to move said head of said yoke toward and away from said movable contact means.

3. An electric thermostat control as described in claim 2, wherein said control shaft is carried by a hub secured to said first housing, said hub having spaced flanges with said arms of said yoke carried by said hub between said flanges.

4. An electric thermostat control as described in claim 2, wherein the said cam means is interchangeable with different operational positions of said auxiliary switch means.

5. A lost motion incorporated electric thermostatic control comprising a control shaft, an indicating dial keyed on said shaft, cam means co-axially positioned with respect to said shaft, switch actuator means with a projecting head straddling said shaft controlled by said cam means, and switch means engaged with the head of said actuator means and operable by said actuator means according to the rotation of said dial and said shaft in either a clockwise or a counterclockwise direction.

6. A lost motion incorporated electric thermostatic control comprising a control shaft, an indicating dial keyed on said shaft, cam means co-axially positioned with respect to said shaft, switch actuator means positioned about said shaft controlled by said cam means, and switch means engaged with the head of said actuator means and operable by said actuator according to the rotation of said dial and said shaft in either a clockwise or a counterclockwise direction, said electric thermostatic control being mounted in one casing and said switch means being mounted in another casing detachably secured to the front wall of said first mentioned casing.

7. An electric thermostat control comprising in combination: a first housing with circuit terminals and a thermostatically controlled switch actuatable according to a control setting; a control assembly including a rotatable control shaft extending into said first housing connecting with said switch to control the setting of said switch; a second housing with circuit terminals extending through a wall thereof for connection in an electric circuit, said second housing enclosing auxiliary switch means connected with said terminals of the second housing, said auxiliary switch means having movable contact means and fixed contact means; and a cam means mounted co-axially on said control shaft, said cam means being shaped so as to have full rises at each end of the limits of the rotation of said control shaft, to thereby close the said contact means of said auxiliary switch means at the end of either clockwise or a counterclockwise rotation of said control shaft for control setting operation in either direction.

8. An electric thermostat control comprising in combination: a first housing with circuit terminals and a thermostatically controlled switch actuatable according to a control setting; a control assembly including a rotatable control shaft extending into said first housing connecting with said switch to control the setting of said switch; a second housing with circuit terminals extending through a wall thereof for connection in an electric circuit, said second housing enclosing auxiliary switch means connected with said terminals of said second housing, said auxiliary switch means including a movable contact carried by a flexible arm and fixed contacts on each side of said movable contact; a switch actuator having a cam follower, said actuator being loosely mounted about control shaft and engaged with said flexible arm of said movable contact, a bearing surface around said control shaft; a cam plate positioned on said bearing surface, said cam plate having a switch operating cam rise formation on a portion of its peripheral rim engaged with said cam follower of said switch actuator, a laterally extending thrust lug on said cam plate, a disk having a radial projection from its periphery, said disk being keyed on said control shaft adjacent said cam plate, so the said thrust lug of said cam plate extends into the path of travel of said radial projection of said disk, means to secure said disk and said cam plate in adjacent aligned position about said control shaft; a control indicator dial on an end of said control shaft for manual rotation on said control shaft and said disk in either a clockwise or a counterclockwise direction, until said radial projection of said disk comes into contact with said thrust lug, said cam plate thereby imparting movement of said switch actuator to move said flexible arm and movable contact from the first fixed contact to the second fixed contact, movement of the said movable contact between said first fixed contact and said second fixed contact by rotation of said shaft and said disk projection in a clockwise direction remaining undisturbed for any position of said control shaft selected to control the setting of said thermostatic switch, until said control shaft and disk with said radial projection is rotated counterclockwise into engagement with the opposite side of said thrust lug, whereby said cam plate is moved again thereby imparting movement to said switch actuator to permit said movable contact to return to said first fixed contact where it remains undisturbed for any position of said control shaft selected to control the setting of said thermostatic switch.

9. A lost motion incorporated electric thermostatic control comprising: a control shaft, an indicating dial keyed on said shaft; cam means co-axially positioned with respect to said shaft, switch actuator means positioned about said shaft controlled by said cam means, switch means engaged with said actuator means and operable by said actuator according to the rotation of said dial and said shaft in either a clockwise or a counterclockwise direction, and an escutcheon plate secured to said control having the field thereof formed with securing openings to facilitate mounting for use.

10. An electric thermostat control comprising in combination: a first housing with circuit terminals and a thermostatically controlled single pole switch actuatable according to a control setting; a control assembly including a rotatable control shaft extending into said first housing connected to said switch to set said switch; a second housing with circuit terminals extending through a wall thereof for connection in an electric circuit, said second housing enclosing auxiliary switch means connected with said terminals of said second housing, said auxiliary switch means having movable contact means and fixed contact means; a switch actuator comprising a yoke, said yoke having spaced depending arms straddling said control shaft; a cam follower on said yoke, said yoke including an upwardly extending head, said head extending into the said second housing for engagement with said movable contact means of said auxiliary switch means; cam means having a cam surface, said cam means being positioned co-axially with and connected to said control shaft, angular adjustment of said shaft moving said cam surface with respect to said cam follower, whereby said head of said yoke is moved toward and away from said movable contact means; and an escutcheon plate having a spider mounting ring around said control shaft with securing openings to accommodate fastener means to secure the control to a domestic appliance.

11. A two directional electric switch thermostat control for incorporating lost motion comprising: a first housing supporting an adjustable thermostatically controlled switch; a manually adjustable control shaft extending into said first housing and connecting said control shaft for adjusting said switch; cam means positioned about said shaft; a yoke with a cam follower straddling said shaft adjacent said cam, said follower engaging the rise of said cam; a lateral thrust lug extending from said cam; means rotatable in either direction about the axis of said shaft engageable with first the left side of said cam lug and then the right side of said cam lug to displace said cam, said follower and said yoke; and a second housing detachably secured to said first housing about said yoke, said second housing having auxiliary switching means with a plurality of contacts therein, said switching means having some of its contacts closed by displacement of said yoke at the limit of each direction of shaft rotation to maintain a closed operating circuit for substantially a complete turning of the shaft toward the other limit.

References Cited by the Examiner
UNITED STATES PATENTS

| | | | |
|---|---|---|---|
| 2,444,146 | 6/48 | Schellens | 200—38 |
| 2,537,582 | 1/51 | Grace | 200—56 |
| 2,786,990 | 3/57 | Garner | 200—140 |
| 2,808,478 | 10/57 | Liebermann | 200—38 |
| 3,091,126 | 5/63 | Bowen | 200—38 |

BERNARD A. GILHEANY, *Primary Examiner.*
ROBERT K. SCHAEFER, *Examiner.*